April 23, 1963     L. T. BARNES ET AL     3,086,554
THROTTLE FOR INTERNAL COMBUSTION ENGINE
Original Filed Aug. 31, 1959

INVENTORS
LLEWELLYN T. BARNES
CHARLES T. BARNES
BY
Amster & Levy
ATTORNEYS

United States Patent Office 3,086,554
Patented Apr. 23, 1963

3,086,554
THROTTLE FOR INTERNAL COMBUSTION ENGINE
Llewellyn T. Barnes and Charles T. Barnes, both of 155 Atlantic Ave., Freeport, N.Y.
Original application Aug. 31, 1959, Ser. No. 837,228. Divided and this application May 11, 1960, Ser. No. 36,105
2 Claims. (Cl. 137—637.3)

This invention relates to improvements in internal combustion engines, and in particular relates to a throttle for use in an internal combustion engine embodying a number of new concepts.

The present application is a division of the application of Llewellyn T. Barnes et al., Serial No. 837,228, filed August 31, 1959, now Patent No. 3,033,181, for Internal Combustion Engine.

An important object of this invention is to provide a throttle for use in a reciprocating internal combustion engine which will aid in attaining a thermal efficiency of as high as 60–70%.

As an important feature of this invention, the reciprocating internal combustion engine in accordance with this invention operates on what may be considered to be a composite cycle, which combines the advantages of the cycles of prior known engines. For convenience, this cycle may be designated as a binary regenerated combustion and steam cycle. In the first part of the cycle, a mixture of fuel, vapor and air is injected into the cylinder through use of the throttle comprising the present invention and according to novel principles which will be explained below. After the explosion of this primary fuel air mixture, and just after the piston has begun its power stroke, superheated steam is expanded within the cylinder and further propels the piston in its power stroke.

Put in other terms, when a reciprocating piston of an internal combustion engine operates a crank, there is a minimum mechanical efficiency in exploding the fuel air mixture at the very end of the compression stroke, because at this time the piston and the crank rod are in line and there is no torque exerted on the crank, regardless of the power of the explosion. One purpose of this invention is to provide a delayed main explosion which occurs after the piston has begun its power stroke, which is after it has passed top dead center with relation to the crank.

The piston is pushed, as in a steam engine, to obtain more uniform action than is obtained by the explosive action of the usual internal combustion engine. In this way, the power stroke achieves some of the advantages of the steam cycle of the "Corliss" design while at the same time avoiding some of the disadvantages of a steam engine or steam boiler.

Other objects and advantages of this invention will become apparent from the following description, in conjunction with the annexed drawings, in which preferred embodiments of the invention are disclosed.

Figure 2:
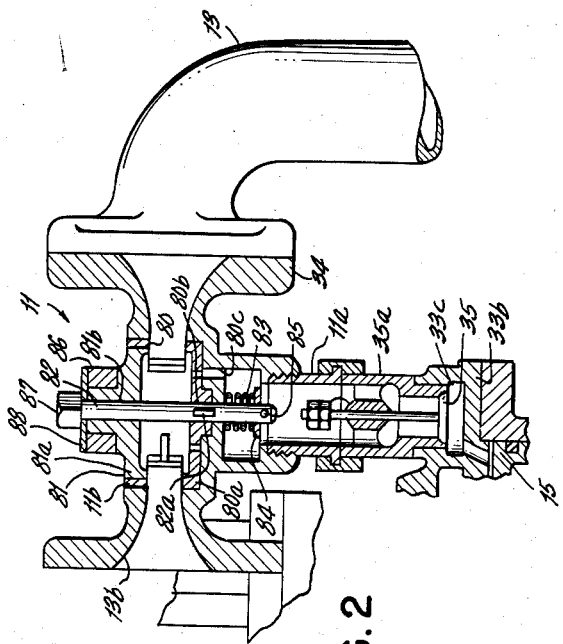
FIG. 2 is a sectional view on the line 2—2 of FIG. 1 illustrating details of construction of the throttle.
Figure 1:
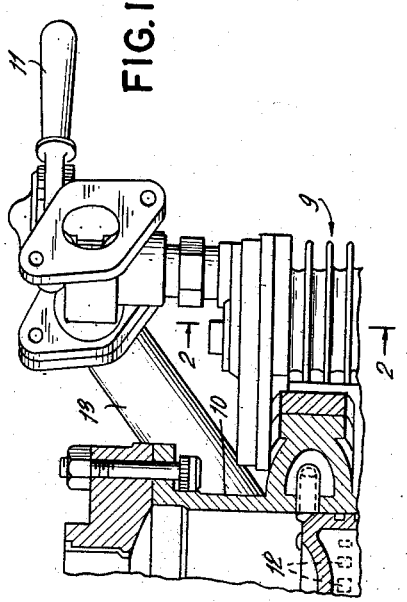
FIG. 1 is a vertical section of parts of the improved internal combustion engine, employing the throttle comprising the present invention.
Figure 3:
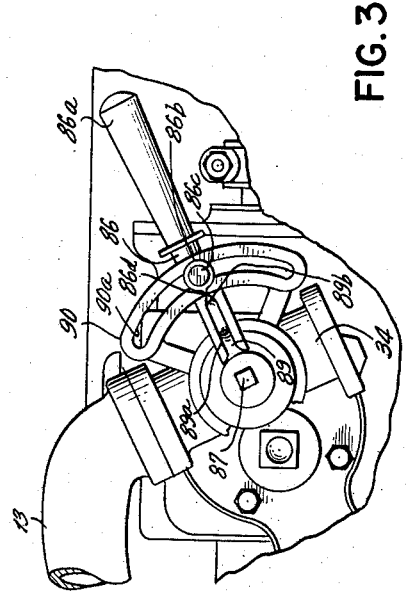
FIG. 3 is a top plan view of my improved throttle.

Throttle 11 is mounted upon the casing 35a for valve 35, by means of union 11a. With continuing reference to the accompanying drawing, throttle 11 serves to control the air intake of charger 9, as well as the air intake of the master cylinder 10.

The housing of throttle 11 has an intake 34 which is adapted to be connected through pipe 13 and any suitable air cleaner (not shown) to the outside atmosphere. The casing of throttle 11 also has an air outlet 13b which is connected by pipe 13 to a boss on main cylinder 10 and hence through ports 12 to the interior of main cylinder 10 and hence to the crank case. It will be understood, of course, that ports 12 are blocked by piston 15 except when main piston 15 is in its upward position.

The casing of throttle 11 has a top bore 11b of cylindrical shape which receives the throttle assembly. The throttle assembly includes a cylindrical member 80 having a bottom wall 80a formed with a central aperture 80b and a plurality of ports 80c of varying diameter. Member 80 is turnable within housing bore 11b. The throttle also includes a further cylindrical member 81 which fits turnably within recess 11b and which has a top wall 81a. A central shaft 82 extends turnably through an opening in the top wall 81a and also through opening 80b and below wall 80a. Below the top wall of the casing of throttle 11, a spring 83 and washer 84 are fixed in place on shaft 82 by cotter pin 85. By means of key 82a and the usual key slot (not shown), shaft 82 is keyed to bottom wall 80a. The upper portion 81b of wall 81a is square and receives throttle lever 86 by extending through a square opening thereof. Shaft 82 has a square key member portion 87 above lever 86 and separated therefrom by washer 88. Auxiliary throttle lever 89 is fixed upon key member 87.

Quadrant member 90 is fixed to the casing of throttle 11 and has a curved part-circular slot 90a. Lever 86 has a usual handle 86a and has a friction guide member 86b slidably received within slot 90a, culminating in an end head 86c which has a pointer 86d facing toward shaft 82. Lever 89 has a free end thumb portion 89a. This has a pointer 89b adapted to be lined up with pointer 86d when desired.

Lever 89a is slidably frictionally engaged by lever 86 in a manner which is not shown. Lever 89 may be turned independently of lever 86. However, once lever 89 is set relative to lever 86, the two levers turn in unison when handle 86a is manipulated. When lever 89 is turned, it turns member 87 and turns shaft 82, and hence turns member 80. The ports 80c of member 80 are adapted to register or not, as the case may be with corresponding ports 82c of varying diameters in the top wall of the casing of throttle 11. Accordingly, by turning lever 89, the registration of ports 80c and 82c is varied and hence the flow of air to valve 35 is varied.

When lever 86 is turned, member 81 is turned. Member 81 has ports 81b which register fully with the chambers of members 34 in one position of member 81, and which are completely out of registration therewith in another turned position of member 81. From this, it will become apparent that lever 86 controls air flow to the main crank case, and lever 89 controls air flow to the charger. Lever 89, therefore, controls the richness of the fuel air mixture fed through ports 23 and 24a to the master cylinder, and lever 86 controls the main flow of air to the chamber.

Lever 86 can control the speed of the engine for varying mixture ratios of the fuel, and the richness of the fuel can be adjusted to the optimum ratio for any given setting of the main throttle 11.

While there have been disclosed a preferred embodiment of the invention and there have been indicated various changes, omissions and additions which can be made therein, it will be apparent that various other changes, omissions and additions may be made in the invention without departing from the scope and spirit thereof.

What is claimed is:
1. A throttle for an internal combustion engine com- prising a casing having a cylindrical bore and having a bottom wall, said bottom wall having a plurality of ports of varying diameters, a first cylindrical member turnably mounted within said bore and having a bottom wall, said first member bottom wall having a further plurality of ports of varying diameters, a second cylindrical member having a hollow interior and being turnably received within said first cylindrical member and having a top wall, an axial shaft extending turnably through said hollow interior and through said top wall of said second cylindrical member and fixed to the bottom wall of said first cylindrical member, a transverse main throttle lever fixed to the top wall of said second cylindrical member, a transverse auxiliary throttle lever fixed to said shaft adjacent said main throttle lever, said levers being turnable independently of each other, said throttle assembly also including means for releasably coupling said levers to each other so that they may be turned in unison, the ports of said casing bottom wall and of said first cylindrical member bottom wall being positioned and adapted and sized to register in varying degree by turning said first cylindrical member, said casing having a peripheral air intake port and a peripheral air outlet port, and means connecting said air intake port to said hollow interior of said second cylindrical member.

2. A throttle for an internal combustion engine comprising a casing having a cylindrical bore and having a bottom wall, said bottom wall having a plurality of ports of varying diameters, a first cylindrical member turnably mounted within said bore and having a bottom wall, said first member bottom wall having a further plurality of ports of varying diameters, a second cylindrical member having a hollow interior and being turnably received within said first cylindrical member and having a top wall, an axial shaft extending turnably through said hollow interior and through said top wall of said second cylindrical member, means including a spring about said shaft and a key extending through said shaft resiliently fixing said axial shaft to the bottom wall of said first cylindrical member, a transverse main throttle lever fixed to the top wall of said second cylindrical member, a transverse auxiliary throttle lever fixed to said shaft adjacent said main throttle lever, said levers being turnable independently of each other, said throttle assembly also including means for releasably coupling said levers to each other so that they may be turned in unison, the ports of said casing bottom wall and of said first cylindrical member bottom wall being positioned and adapted and sized to register in varying degree by turning said first cylindrical member, said casing having a peripheral air intake port and a peripheral air outlet port, and means connecting said air intake port to said hollow interior of said second cylindrical member.

References Cited in the file of this patent

UNITED STATES PATENTS

| | | |
|---|---|---|
| 1,196,520 | Chadwick | Aug. 29, 1916 |
| 2,510,356 | Werts | June 6, 1950 |
| 2,538,215 | Stack | Jan. 16, 1951 |